US012565204B2

(12) United States Patent
Tamura

(10) Patent No.: US 12,565,204 B2
(45) Date of Patent: Mar. 3, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Takao Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 18/231,268

(22) Filed: Aug. 8, 2023

(65) Prior Publication Data

US 2024/0051530 A1     Feb. 15, 2024

(30) Foreign Application Priority Data

Aug. 10, 2022     (JP) .................................. 2022-128411

(51) Int. Cl.
*B60W 30/12*          (2020.01)
*B60W 10/04*          (2006.01)
               (Continued)

(52) U.S. Cl.
CPC ............ *B60W 30/12* (2013.01); *B60W 10/04* (2013.01); *B60W 10/18* (2013.01); *B60W 10/20* (2013.01);
               (Continued)

(58) Field of Classification Search
CPC ...... B60W 30/12; B60W 10/04; B60W 10/18; B60W 10/20; B60W 60/001;
               (Continued)

(56) References Cited

U.S. PATENT DOCUMENTS

2016/0259335 A1     9/2016 Oyama
2020/0247407 A1     8/2020 Huang et al.
               (Continued)

FOREIGN PATENT DOCUMENTS

JP          11-211492          8/1999
JP          2001-291197          10/2001
               (Continued)

OTHER PUBLICATIONS

Japanese Notice of Allowance for Japanese Patent Application No. 2022-128411 mailed Dec. 22, 2023.

*Primary Examiner* — Anne Marie Antonucci
*Assistant Examiner* — Jewel A Kuntz
(74) *Attorney, Agent, or Firm* — Amin, Turocy & Watson, LLP

(57)          ABSTRACT

Provided is a vehicle control device configured to: recognize a surrounding situation of a vehicle; control steering and acceleration/deceleration of the vehicle based on the recognized surrounding situation and map information; determine a driving mode of the vehicle as any one of a plurality of driving modes including a first driving mode and a second driving mode; determine whether or not a camera road division line matches a map road division line; and compare, when the camera road division line and the map road division line are determined not to match each other during traveling of the vehicle in the second driving mode, a first distance with a second distance, and when the second distance is larger than the first distance, change the second driving mode to the first driving mode that is performed referring to the camera road division line.

10 Claims, 6 Drawing Sheets

(51) Int. Cl.

| | |
|---|---|
| *B60W 10/18* | (2012.01) |
| *B60W 10/20* | (2006.01) |
| *B60W 60/00* | (2020.01) |
| *G01C 21/30* | (2006.01) |

(52) U.S. Cl.
CPC ...... *B60W 60/001* (2020.02); *B60W 60/0055* (2020.02); *G01C 21/30* (2013.01); *B60W 2420/403* (2013.01); *B60W 2530/00* (2013.01); *B60W 2552/53* (2020.02)

(58) Field of Classification Search
CPC ....... B60W 60/0055; B60W 2420/403; B60W 2530/00; B60W 2552/53; B60W 2552/00; B60W 60/0053; B60W 30/18163; B60W 30/182; B60W 40/04; B60W 40/06; B60W 60/0011; B60W 60/005; G01C 21/30
See application file for complete search history.

(56) References Cited

U.S. PATENT DOCUMENTS

| | | | |
|---|---|---|---|
| 2021/0179138 A1* | 6/2021 | Terazawa | ........... G01C 21/3476 |
| 2021/0291830 A1* | 9/2021 | Tamura | ................ G06V 20/588 |
| 2022/0161794 A1* | 5/2022 | Kakeda | ............. B60W 60/0059 |
| 2023/0399028 A1* | 12/2023 | Yamabe | .............. B60W 60/005 |

FOREIGN PATENT DOCUMENTS

| | | |
|---|---|---|
| JP | 2016-162299 | 9/2016 |
| JP | 2017-061265 | 3/2017 |
| JP | 2018-045500 | 3/2018 |
| JP | 2021-149321 | 9/2021 |

* cited by examiner

FIG. 2

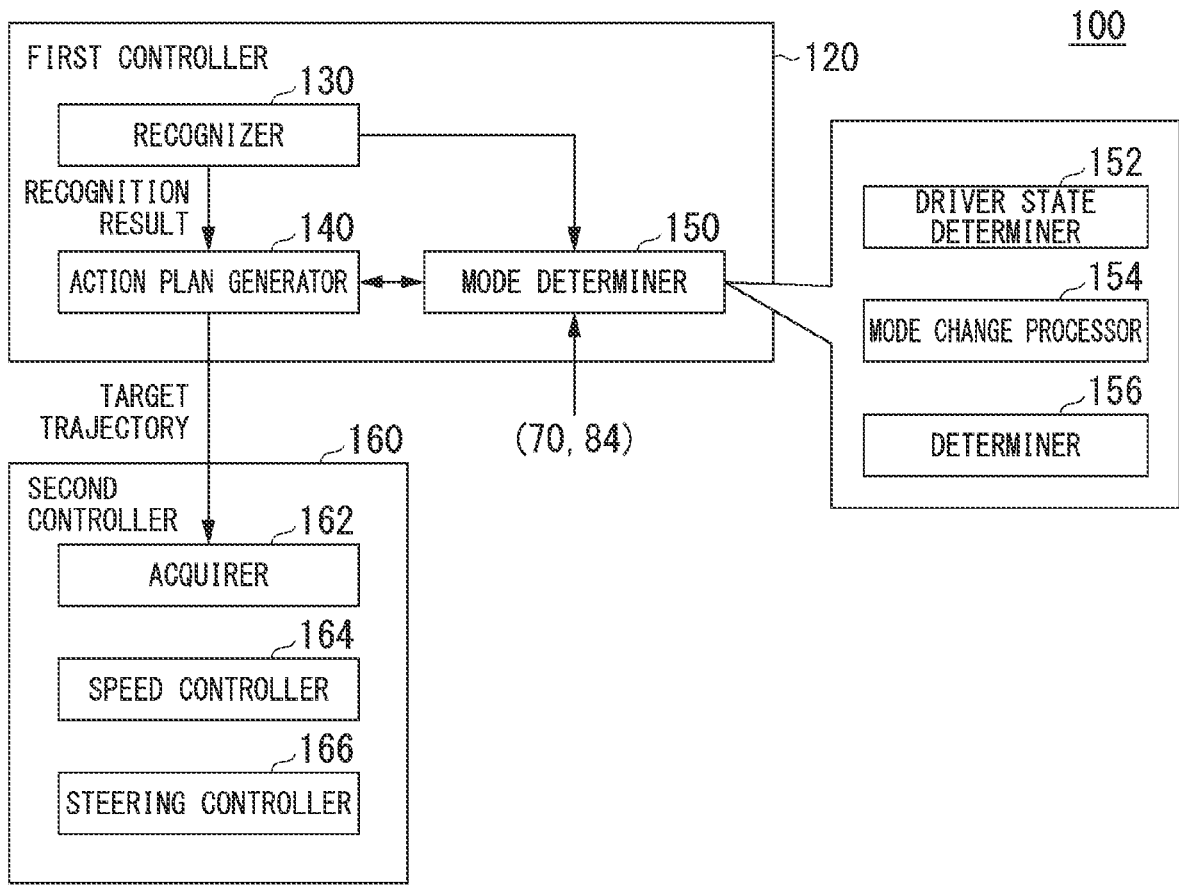

FIG. 3

| DRIVING MODE | CONTROL STATE | TASK |
|---|---|---|
| MODE A | AUTOMATIC DRIVING | MONITORING OF FRONT FIELD OF VIEW:UNNECESSARY GRASP OF STEERING WHEEL:UNNECESSARY |
| MODE B | DRIVING ASSISTANCE | MONITORING OF FRONT FIELD OF VIEW:NECESSARY GRASP OF STEERING WHEEL:UNNECESSARY |
| MODE C | DRIVING ASSISTANCE | MONITORING OF FRONT FIELD OF VIEW:NECESSARY GRASP OF STEERING WHEEL:NECESSARY |
| MODE D | DRIVING ASSISTANCE | MONITORING OF FRONT FIELD OF VIEW:NECESSARY AT LEAST SOME DRIVING OPERATION IS REQUIRED |
| MODE E | MANUAL DRIVING | MONITORING OF FRONT FIELD OF VIEW:NECESSARY DRIVING OPERATION IS REQUIRED FOR BOTH OF STEERING AND ACCELERATION/DECELERATION |

TASK:LIGHTER

TASK:HEAVIER

VEHICLE CONTROL DEVICE, VEHICLE CONTROL METHOD, AND STORAGE MEDIUM

CROSS-REFERENCE TO RELATED APPLICATION

The application is based on Japanese Patent Application No. 2022-128411 filed on Aug. 10, 2022, the content of which is incorporated herein by reference.

BACKGROUND

Field of the Invention

The present invention relates to a vehicle control device, a vehicle control method, and a storage medium.

Description of Related Art

Hitherto, the technology of controlling a vehicle based on map road division line information and camera road division line information photographed by a camera mounted in a vehicle. For example, Japanese Patent Application Laid-open No. 2017-61265 describes performing lane keeping control referring to camera road division line information when the camera road division line information matches map road division line information, whereas performing lane keeping control referring to previous camera road division line information and map road division line information when the camera road division line information does not match the map road division line information.

SUMMARY

However, although the related art executes vehicle driving control by inspecting the degree of match between the camera road division line information and the map road division line information, the related art does not perform driving control by inspecting the center line of the travel lane. As a result, driving control cannot be executed appropriately in some cases based on the center line of the travel lane.

The present invention has been made in view of the above-mentioned circumstances, and has an object to provide a vehicle control device, a vehicle control method, and a storage medium, which are capable of executing driving control appropriately based on the center line of the travel lane.

A vehicle control device, a vehicle control method, and a storage medium according to the present invention adopt the following configuration.

(1): According to an embodiment of the present invention, there is provided a vehicle control device including a storage medium storing computer-readable commands, and a processor connected to the storage medium, the processor being configured to execute the computer-readable commands to: recognize a surrounding situation of a vehicle; control steering and acceleration/deceleration of the vehicle based on the recognized surrounding situation and map information without depending on an operation performed by a driver of the vehicle; determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; change the driving mode of the vehicle to a driving mode imposing a heavier task when the task of the determined driving mode is not performed by the driver; determine whether or not a camera road division line included in the surrounding situation matches a map road division line included in the map information; and compare, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line.

(2): In the aspect (1), the first distance is a value calculated based on a lane width of a travel lane of the vehicle, which is calculated from the camera road division lines on both sides, and a vehicle width indicated by the vehicle information.

(3): In the aspect (1), the second distance is a value calculated based on a left distance between the map road division line on a left side and a map road center line included in the map information, a right distance between the map road division line on a right side and the map road center line, and a lane width of a travel lane of the vehicle, which is calculated from the camera road division lines on both sides.

(4): In the aspect (3), the processor compares the first distance with at least one of the left distance and the right distance, and when a period in which at least one of the left distance and the right distance is larger than the first distance has elapsed for a first predetermined period, changes the second driving mode to the first driving mode that is performed referring to the camera road division line.

(5): In the aspect (1), when the processor has changed the second driving mode to the first driving mode that is performed referring to the camera road division line, the processor continues the first driving mode that is performed referring to the camera road division line at least for a second predetermined period.

(6): In the aspect (1), when the processor has continued the first driving mode that is performed referring to the camera road division line for a second predetermined period and the second distance becomes equal to or smaller than the first distance after next comparison, the processor returns the first driving mode that is performed referring to the camera road division line to the second driving mode.

(7): In the aspect (1), when the processor has continued the first driving mode that is performed referring to the camera road division line for a third predetermined period and the second distance is larger than the first distance after next comparison, the processor changes the first driving mode to a manual driving mode of the vehicle performed by the driver of the vehicle.

(8): In the aspect (1), when the second distance becomes larger than the first distance and there is a preceding vehicle ahead of the vehicle, the processor continues the second driving mode without changing the second driving mode to the first driving mode that is performed referring to the camera road division line.

(9): According to another aspect of the present invention, there is provided a vehicle control method to be executed by a computer, the vehicle control method including: recognizing a surrounding situation of a vehicle; controlling steering and acceleration/deceleration of the vehicle based on the recognized surrounding situation and map information without depending on an operation performed by a driver of the vehicle; determining a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; changing the driving mode of the vehicle to a driving mode imposing a heavier task when the task of the determined driving mode is not performed by the driver; determining whether or not a camera road division line included in the surrounding situation matches a map road division line included in the map information; and comparing, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line.

(10) According to another aspect of the present invention, there is provided a non-transitory computer-readable storage medium storing a program for causing a computer to: recognize a surrounding situation of a vehicle; control steering and acceleration/deceleration of the vehicle based on the recognized surrounding situation and map information without depending on an operation performed by a driver of the vehicle; determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver; change the driving mode of the vehicle to a driving mode imposing a heavier task when the task of the determined driving mode is not performed by the driver; determine whether or not a camera road division line included in the surrounding situation matches a map road division line included in the map information; and compare, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line.

According to the aspects (1) to (10), it is possible to execute driving control appropriately based on the center line of the travel lane.

BRIEF DESCRIPTION OF THE DRAWINGS

FIG. 2 is a functional configuration diagram of a first controller and a second controller.

FIG. 3 is a diagram illustrating an example of a correspondence relationship among a driving mode, the control state of a host vehicle, and a task.

DESCRIPTION OF EMBODIMENTS

Now, a vehicle control device, a vehicle control method, and a storage medium according to an embodiment of the present invention are described with reference to the drawings.

[Overall Configuration]

Figure 1:
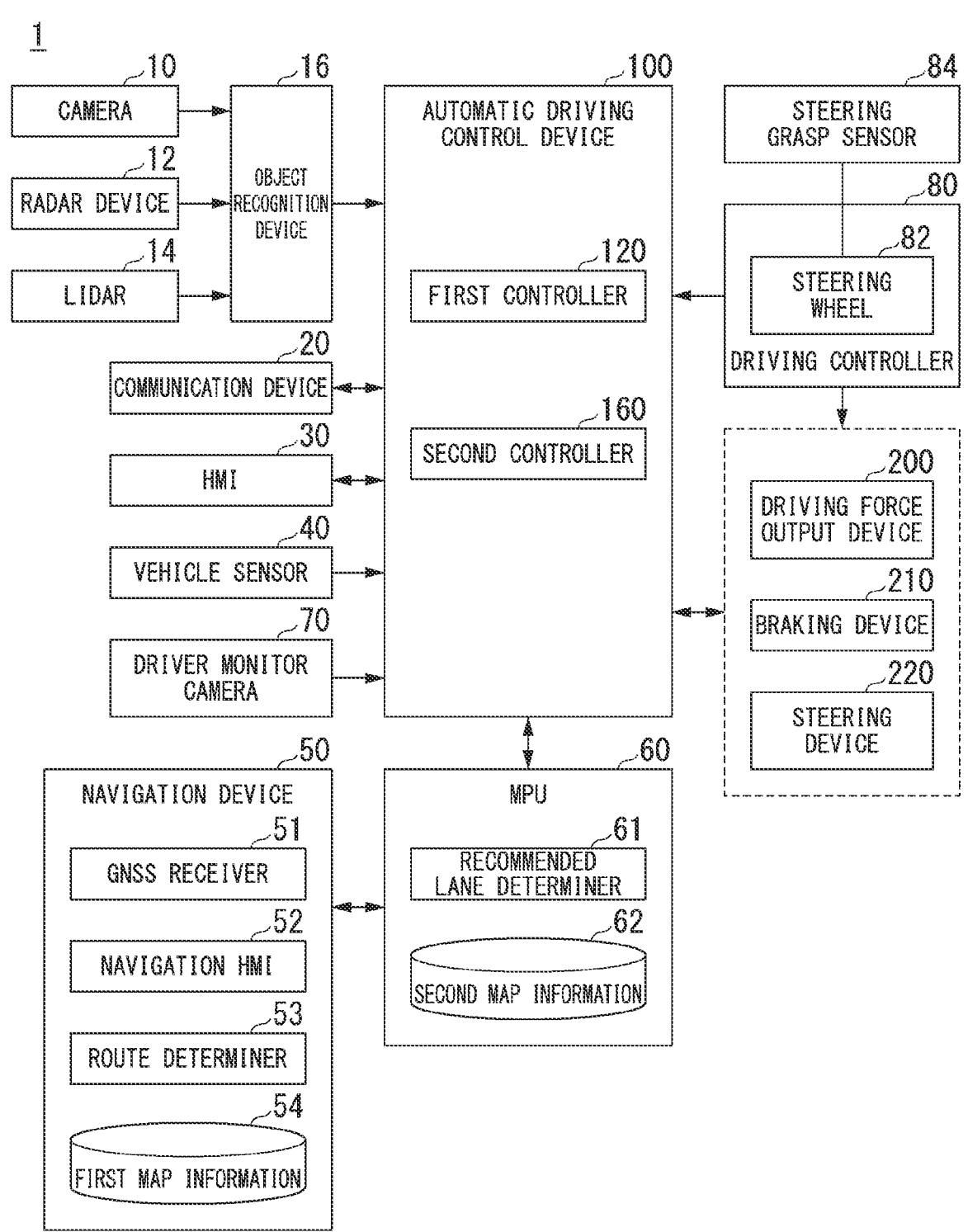
FIG. 1 is a configuration diagram of a vehicle system 1 that uses a vehicle control device according to an embodiment.

FIG. 1 is a configuration diagram of a vehicle system 1 that uses a vehicle control device according to an embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driver monitoring camera 70, a driving controller 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "host vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the host vehicle M periodically, for example. The camera 10 may be a stereo camera.

The radar device 12 radiates a radio wave such as a millimeter wave toward the surroundings of the host vehicle M, and detects a radio wave (reflected wave) reflected by an object, to detect at least the position (distance and direction)

of the object. The radar device 12 is mounted on any part of the host vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the host vehicle M, and measures diffused light. The LIDAR 14 detects a distance to a target based on a period of time since emission of light until reception of light. The light to be radiated is, for example, pulsed laser light. The LIDAR 14 is mounted on any part of the host vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1.

The communication device 20 uses, for example, a cellular network, a Wi-Fi network, Bluetooth (trademark), or DSRC (Dedicated Short Range Communication) to communicate with another vehicle existing near the host vehicle M or communicate with various kinds of server devices via a radio base station.

The HMI 30 presents various kinds of information to an occupant of the host vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the host vehicle M, an acceleration sensor that detects an acceleration, a yaw rate sensor that detects an angular speed with respect to a vertical axis, and an orientation sensor that detects an orientation of the host vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the host vehicle M based on a signal received from a GNSS satellite. The position of the host vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI described above may be integrated partially or completely. The route determiner 53 refers to the first map information 54 to determine a route (hereinafter referred to as "map route") from the position (or any input position) of the host vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended route for each block with reference to the second map information 62. The recommended lane determiner 61 determines on which lane the host vehicle M is to travel. When there is a junction on a map route, the recommended lane determiner 61 determines a recommended route so that the host vehicle M can travel on a route for efficiently entering the junction.

The second map information 62 is map information having higher precision than that of the first map information 54. The second map information 62 includes, for example, information on the center of a lane or information on the boundary of a lane. In particular, in this embodiment, the second map information 62 includes information relating to left and right road division lines (hereinafter sometimes referred to as "map road division line") on the lane and a center line (hereinafter sometimes referred to as "map road center line") on the lane. The second map information 62 may further include, for example, road information, traffic regulation information, address information (address or postal code), facility information, phone number information, and information on a section in which a mode A or mode B described later is prohibited. The second map information 62 may be updated appropriately through communication between the communication device 20 and another device.

The driver monitor camera 70 is, for example, a digital camera that uses a solid image pickup device such as a CCD or a CMOS. The driver monitor camera 70 is mounted on any part of the host vehicle M at a position and in a direction so as to be capable of picking up a front image of a head of an occupant (hereinafter referred to as "driver") sitting on a driver seat of the host vehicle M (in the direction of picking up an image of the face). For example, the driver monitor camera 70 is mounted on an upper part of a display device provided on the center of an instrumental panel of the host vehicle M.

The driving controller 80 includes, for example, an acceleration pedal, a brake pedal, a gear shift, and other controllers in addition to the steering wheel 82. A sensor that detects an operation amount or whether an operation is applied is mounted on the driving controller 80, and the detection result is output to the automatic driving control device 100 or a part or all of the driving force output device 200, the braking device 210, and the steering device 220. The steering wheel 82 is an example of an "controller that receives a steering operation performed by a driver". The controller is not always required to have a ring shape, and may have other shapes for steering, or may be a joystick or a button. A steering grasp sensor 84 is attached to the steering wheel 82. The steering grasp sensor 84 is implemented by, for example, a capacitive sensor, and outputs, to the automatic driving control device 100, a signal that enables detection of whether or not the driver is grasping the steering wheel 82 (in contact with the steering wheel 82 so as to be able to apply a force).

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100. The automatic driving control device 100 is an example of "vehicle control device", and a combination of an action plan generator 140 and a second controller 160 is an example of "driving controller".

FIG. 2 is a functional configuration diagram of the first controller 120 and the second controller 160. The first controller 120 includes, for example, a recognizer 130, an action plan generator 140, and a mode determiner 150. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integrated evaluation. The reliability of automatic driving is ensured in this manner.

The recognizer 130 recognizes states such as the position, speed, and acceleration of an object near the host vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the host vehicle M to be used for control. The position of an object may be represented by a representative point such as a center of gravity or corner of the object, or may be represented by a region. The "state" of an object may include the acceleration, jerk, or "action state" (for example, whether or not the host vehicle M is changing a lane or is trying to change a lane) of the object.

The recognizer 130 recognizes, for example, a lane (travel lane) on which the host vehicle M is traveling. For example, the recognizer 130 recognizes the travel lane by comparing a pattern (for example, arrangement of solid lines and broken lines) of a road division line obtained from the second map information 62 with a pattern of a road division line near the host vehicle M recognized from the image photographed by the camera 10, to thereby recognize the travel lane. In addition to the road division line, the recognizer 130 may recognize the travel lane by recognizing a travel path boundary (road boundary) including, for example, a road division line, the shoulder of a road, a curb, a center median, and a guardrail. In particular, in this embodiment, the recognizer 130 recognizes left and right road division lines (hereinafter referred to as "camera road division line") on the lane and the center line (hereinafter referred to as "camera road center line") on the lane based on the image photographed by the camera 10. The camera road center line is recognized as the center line of the left and right camera road division lines. In this recognition, the position of the host vehicle M acquired from the navigation device 50 or the result of processing by the INS may be considered. The recognizer 130 recognizes a stop line, an obstacle, red light, a toll gate, and other road events.

The recognizer 130 recognizes the position or posture of the host vehicle M with respect to a travel lane when recognizing the travel lane. The recognizer 130 may recognize, for example, as the relative position and posture of the host vehicle M with respect to the travel lane, a deviation of the reference point of the host vehicle M from the center of the lane and an angle with respect to a line obtained by connecting the centers of the lane in the travel direction of the host vehicle M. Instead, the recognizer 130 may recognize, for example, the position of the reference point of the host vehicle M with respect to any side edge (road division line or road boundary) of the travel lane as the relative position of the host vehicle M with respect to the travel lane.

The action plan generator 140 generates a target trajectory in which the host vehicle M is to travel in the future (without depending on an operation performed by the driver) automatically so as to be capable of traveling on a recommended lane determined by the recommended lane determiner 61 in principle and coping with the surrounding situation of the host vehicle M. The target trajectory includes, for example, a speed component. For example, the target trajectory is represented by arranging the locations (trajectory points) to be reached by the host vehicle M. The trajectory points are locations to be reached by the host vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the host vehicle M in each sampling period. In this case, information on the target speed and the target acceleration is represented by an interval between trajectory points.

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event.

The mode determiner 150 determines a driving mode of the host vehicle M as any one of a plurality of driving modes imposing different tasks on the driver. The mode determiner 150 includes, for example, a driver state determiner 152 and a mode change processor 154. The functions of these components are described later.

FIG. 3 is a diagram illustrating an example of a correspondence relationship among a driving mode, a control state of the host vehicle M, and a task. The driving mode of the host vehicle M includes, for example, five modes, namely, a mode A to a mode E. The control state, namely, the degree of automatic driving control of the host vehicle M is the highest for the mode A, and the degree of automatic driving control decreases in order of the mode B, the mode C, the mode D, and the mode E. In contrast, the degree of a task imposed on a driver is the smallest for the mode A, and increases in order of the mode B, the mode C, the mode D, and the mode E. The mode D or the mode E is a control state that is not automatic driving, and thus the automatic driving control device 100 has a responsibility to finish control relating to automatic driving, and cause the driving mode to transition to driving assistance or manual driving. Now, examples of details of the respective driving modes are given in the following.

The mode A relates to the state of automatic driving, and the driver does not bear any one of the tasks of monitoring the front field of view and grasping the steering wheel 82. However, even in the mode A, the driver is required to have a posture of being able to immediately transition to manual driving in response to a request from a system, which is mainly the automatic driving control device 100. The automatic driving indicates that both of steering and acceleration/deceleration are controlled irrespective of an operation of the driver. The front field of view means a space in the travel direction of the host vehicle M visually recognized through a front wind shield. The mode A is a driving mode that can be executed, for example, when the host vehicle M is traveling at a speed equal to or lower than the upper limit vehicle speed (for example, about 50 [km/h]) on an expressway such as a highway, and there is a preceding vehicle for the host vehicle M to follow, which is sometimes referred to as TJP (Traffic Jam Pilot). When this condition is not satisfied, the mode determiner 150 changes the driving mode of the host vehicle M to the mode B.

The mode B relates to the state of driving assistance, and the driver bears the task of monitoring the front field of view of the host vehicle M, but does not have the task of grasping the steering wheel 82. The mode C relates to the state of driving assistance, and the driver bears the task of monitoring the front field of view, and the task of grasping the steering wheel 82. The mode D is a driving mode in which the driver is required to perform a certain degree of operation for at least one of steering and acceleration/deceleration of the host vehicle M. For example, in the mode D, driving assistance such as ACC (Adaptive Cruise Control) or LKAS (Lane Keeping Assist System) is performed. The mode E refers to the state of manual driving in which the driver is required to perform a driving operation for both of steering and acceleration/deceleration. In both of the mode D and the mode E, the driver naturally bears the task of monitoring the front field of view of the host vehicle M.

The automatic driving control device 100 (and driving assistance device (not shown)) executes automatic lane change that depends on the driving mode. The automatic lane change includes an automatic lane change (1) required by the system and an automatic lane change (2) required by the driver. The automatic lane change (1) includes an automatic lane change for passing a preceding vehicle, which is performed when the vehicle speed of the preceding vehicle is lower than the vehicle speed of the host vehicle by a reference amount or more, and an automatic lane change (automatic lane change caused by change of recommended lane) for traveling toward the destination. The automatic lane change (2) is to change the lane of the host vehicle M toward an operation direction when the driver has operated a blinker in a case where, for example, a condition on the vehicle speed or a positional relationship with a nearby vehicle is satisfied.

In the mode A, the automatic driving control device 100 does not execute any one of the automatic lane change (1) and the automatic lane change (2). In the mode B and the mode C, the automatic driving control device 100 executes both of the automatic lane change (1) and the automatic lane change (2). In the mode D, the driving assistance device (not shown) does not execute the automatic lane change (1) but executes the automatic lane change (2). In the mode E, both of the automatic lane change (1) and the automatic lane change (2) are not executed.

When the task of the determined driving mode (hereinafter referred to as "current driving mode") is not performed by the driver, the mode determiner 150 changes the driving mode of the host vehicle M to a driving mode that imposes a heavier task.

For example, when the driver is in a posture of not being able to transition to manual driving in response to a request from the system in the mode A (for example, when the driver is continuously looking aside or when a sign that indicates a difficulty in driving is detected), the mode determiner 150 uses the HMI 30 to prompt the driver to transition to manual driving, and when the driver does not respond, the mode determiner 150 performs control of causing the host vehicle M to gradually stop at the shoulder of the road and stopping automatic driving. After automatic driving is stopped, the host vehicle M is set to the state of the mode D or the mode E, and the host vehicle M can be caused to start by a manual operation performed by the driver. The following description holds true for the case of "stopping automatic driving". When the driver is not monitoring the front field of view in the mode B, the mode determiner 150 uses the HMI 30 to prompt the driver to monitor the front field of view, and when the driver does not respond, the mode determiner 150 performs control of causing the host vehicle M to gradually stop at the shoulder of the road and stopping automatic driving. When the driver is not monitoring the front field of view or is not grasping the steering wheel 82 in the mode C, the mode determiner 150 uses the HMI 30 to prompt the driver to monitor the front field of view and/or to grasp the steering wheel 82, and when the driver does not respond, the mode determiner 150 performs control of causing the host vehicle M to gradually stop at the shoulder of the road and stopping automatic driving.

The driver state determiner 152 monitors the state of the driver and determines whether the state of the driver is a state that depends on a task in order to perform the mode change described above. For example, the driver state determiner 152 analyzes an image photographed by the driver monitor camera 70 to perform posture estimation processing, and determines whether the driver is in a posture of not being able to transition to manual driving in response to a request from the system. The driver state determiner 152 analyzes the image photographed by the driver monitor camera 70 to perform line-of-sight estimation processing, and determines whether or not the driver is monitoring the front field of view.

The mode change processor 154 performs various kinds of processing for changing the mode. For example, the mode change processor 154 instructs the action plan generator 140 to generate a target trajectory for stopping at the shoulder, gives an activation instruction to the driving assistance device (not shown), or controls the HMI 30 to cause the driver to perform an action. The operation of the determiner 156 is described later.

The second controller 160 controls the driving force output device 200, the braking device 210, and the steering device 220 so that the host vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control. As an example, the steering controller 166 executes feed-forward control that depends on the curvature of the road in front of the host vehicle M and feedback control based on a deviation from the target trajectory.

The driving force output device 200 outputs, to a drive wheel, a traveling driving force (torque) for causing the host vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving controller 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving controller 80, and causes a brake torque that depends on a braking operation to be output to each wheel. The braking device 210 may include, as a backup, a mechanism for transmitting the hydraulic pressure, which is caused by an operation of the brake pedal included in the driving controller 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving controller 80 to change the orientation of the steered wheel.

[Operation of Vehicle Control Device]

Figure 4:
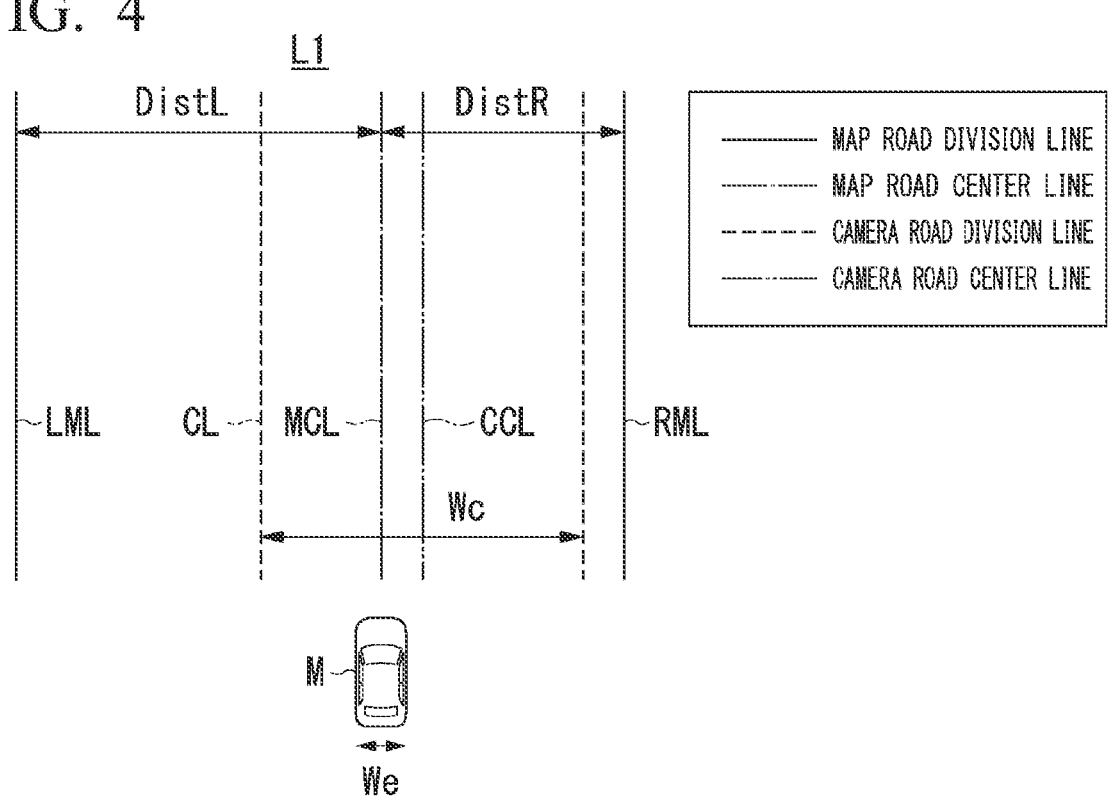
FIG. 4 is a diagram illustrating an example of a scene in which the operation of the vehicle control device according to an embodiment is executed.

Next, description is given of operation of a vehicle control device according to an embodiment. FIG. 4 is a diagram illustrating an example of a scene in which the operation of the vehicle control device according to an embodiment is executed. In FIG. 4, it is assumed that the driving mode of the host vehicle M is the mode B, and the host vehicle M is traveling on a lane L1 referring to the map road center line included in the second map information 62 as a reference line (in other words, along the map road center line). In FIG. 4, the reference symbol LML indicates a left-side map road division line, the reference symbol RML indicates a right-side map road division line, the reference symbol MCL indicates a map road center line, the reference symbol CL indicates a camera road division line, the reference symbol CCL indicates a camera road center line, the reference symbol We indicates the lane width between the left and right camera road division lines, We indicates the vehicle width of the host vehicle M, DistL indicates a distance between the left-side map road division line LML and the map road center line MCL, and DistR indicates a distance between the right-side map road division line RML and the map road center line MCL. The map road center line MCL is stored in the second map information 62 in advance, and the camera road center line CCL is derived as the center line between the left and right camera road division lines CL when those left and right camera road division lines CL are acquired. Further, the vehicle width We is measured in advance, and stored in the automatic driving control device 100.

The determiner 156 determines whether or not the camera road division line CL recognized based on the image photographed by the camera 10 matches the map road division line ML included in the second map information 62. More specifically, for example, the determiner 156 determines whether or not a distance between the camera road division line CL and the map road division line ML is equal to or smaller than a threshold value for each of the camera road division line CL and the map road division line ML on the left side and the camera road division line CL and the map road division line ML on the right side. The determiner 156 determines that the camera road division line CL and the map road division line ML do not match each other when the distance between the camera road division line CL and the map road division line ML on at least one side is larger than the threshold value. Alternatively, for example, the determiner 156 may determine whether or not an angle between the camera road division line CL and the map road division line ML is equal to or smaller than a threshold value for each of the camera road division line CL and the map road division line ML on the left side and the camera road division line CL and the map road division line ML on the right side. The determiner 156 may determine that the camera road division line CL and the map road division line ML do not match each other when the angle between the camera road division line CL and the map road division line ML on at least one side is larger than the threshold value.

The mode determiner 150 first calculates a first distance D1 and a second distance D2 described below when the determiner 156 determines that the camera road division line CL and the map road division line ML do not match each other. More specifically, the mode determiner 150 calculates the first distance D1 by D1=Wc/2−We/2, for example. The first distance D1 represents a distance, by which the host vehicle M can move in the lateral direction before reaching the camera road division line CL, in consideration of the vehicle width We on the assumption that the host vehicle M is located on the camera road center line CCL.

Further, the mode determiner 150 calculates the second distance D2 by D2=max(DistL−Wc/2, DistR−Wc/2), for example. The second distance D2 represents, out of the left side and the right side, a larger difference between the width of the map road division line ML and the width of the camera road division line CL. In other words, a larger second distance D2 indicates that on one of the left side and the right side, the width of the map road division line ML deviates from the width of the camera road division line CL, and the map road center line MCL tends to be offset in the opposite direction. For example, in the case of the situation illustrated in FIG. 4, DistL>DistR is satisfied, and thus D2=max(DistL−Wc/2,DistR−Wc/2)=DistL−Wc/2 is obtained, and it is understood that the width of the map road division line LML on the left side is larger, and the map road center line MCL is offset in the right direction, which is the opposite direction.

After calculating the first distance D1 and the second distance D2 and determining that the second distance D2 is larger than the first distance D1, the mode determiner 150 determines that the map road center line MCL is offset too much, in other words, there is an error in the second map information 62.

After determining that there is an error in the second map information 62, the mode determiner 150 changes the driving mode of the mode B referring to the map road center line MCL as the reference line to the driving mode of the mode C referring to the camera road center line CCL as the reference line. The mode determiner 150 may determine that there is an error in the second map information 62 when a period in which the second distance D2 is determined to be larger than the first distance D1 is equal to or larger than a first predetermined period.

Figure 5:
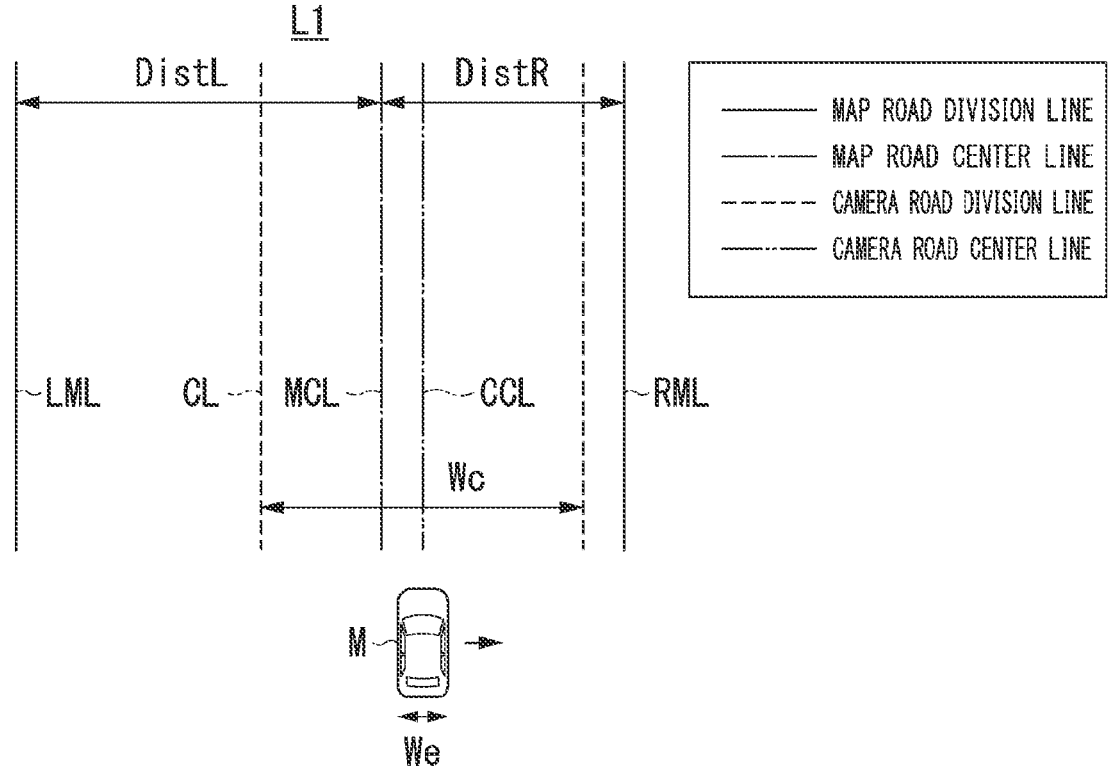
FIG. 5 is a diagram for describing processing to be executed when the mode determiner determines that there is an error in second map information.

FIG. 5 is a diagram for describing processing to be executed when the mode determiner 150 determines that there is an error in the second map information 62. FIG. 5 represents a situation in which the driving mode of the mode B is changed to the driving mode of the mode C referring to the camera road center line CCL as the reference line as a result of determination that there is an error in the second map information 62 by the mode determiner 150.

As illustrated in FIG. 5, when the driving mode is changed to the driving mode of the mode C referring to the camera road center line CCL as the reference line, the action plan generator 140 generates such a target trajectory that the host vehicle M travels along the camera road center line CCL, and the second controller 160 causes the host vehicle M to travel along the generated target trajectory. In other words, it is possible to execute driving control appropriately based on the center line of the travel lane by causing the host vehicle M to travel along the camera road center line CCL instead of the map road center line MCL included in the second map information 62 that may contain an error.

After changing the driving mode of the mode B referring to the map road center line MCL as the reference line to the driving mode of the mode C referring to the camera road center line CCL as the reference line, the mode determiner 150 continues the driving mode of the mode C for at least a second predetermined period. This is because when the driving mode is returned to the driving mode of the mode B immediately after an error in the second map information 62 is resolved, hunting occurs in the driving mode and the occupant of the host vehicle M may feel uncomfortable.

In view of this, after continuing the driving mode of the mode C referring to the camera road center line CCL as the reference line for a second predetermined period, the mode determiner 150 recalculates the first distance D1 and the second distance D2 and compares the first distance D1 and the second distance D2. When the recalculated second distance D2 is equal to or smaller than the recalculated first distance D1, the mode determiner 150 returns the driving mode of the mode C referring to the camera road center line CCL as the reference line to the driving mode of the mode B referring to the map road center line MCL as the reference line.

Further, when a third predetermined period longer than the second predetermined period has elapsed since the mode determiner 150 changed the driving mode of the mode B referring to the map road center line MCL as the reference line to the driving mode of the mode C referring to the camera road center line CCL as the reference line, the mode determiner 150 recalculates the first distance D1 and the second distance D2 and compares the first distance D1 and the second distance D2 again. When the recalculated second distance D2 is still larger than the recalculated first distance D1, the mode determiner 150 changes the driving mode of the mode C to the driving mode of the mode D or mode E. That is, it is possible to execute driving control more appropriately by changing the driving mode to a driving mode imposing a heavier task when a period in which there is estimated to be an error in the second map information 62 has continued for a long period.

In the description given above, the first predetermined period, second predetermined period, and third predetermined period used for determination may be continuous distances travelled by the host vehicle M. For example, the mode determiner 150 may determine that there is an error in the second map information 62 when the host vehicle M has travelled by a first predetermined distance continuously while the second distance D2 is determined to be larger than the first distance D1. Further, for example, the mode determiner 150 may continue the driving mode of the mode C at least until the host vehicle M has travelled by a second predetermined distance continuously after changing the driving mode of the mode B referring to the map road center line MCL as the reference line to the driving mode of the mode C referring to the camera road center line CCL as the reference line. Further, for example, the mode determiner 150 may recalculate the first distance D1 and the second distance D2 when the host vehicle M has travelled by a third predetermined distance longer than the second predetermined distance after changing the driving mode of the mode B referring to the map road center line MCL as the reference line to the driving mode of the mode C referring to the camera road center line CCL as the reference line.

Further, in the description given above, the mode determiner 150 changes the driving mode of the mode B referring to the map road center line MCL as the reference line to the driving mode of the mode C referring to the camera road center line CCL as the reference line when the mode determiner 150 determines that there is an error in the second map information 62. However, the present invention is not limited to such a configuration, and the mode determiner 150 may continue the driving mode of the mode B referring to the trajectory of a preceding vehicle as the reference line when there is a preceding vehicle within a predetermined distance from the host vehicle M in the travel direction after the mode determiner 150 determines that there is an error in the second map information 62.

Figure 6:
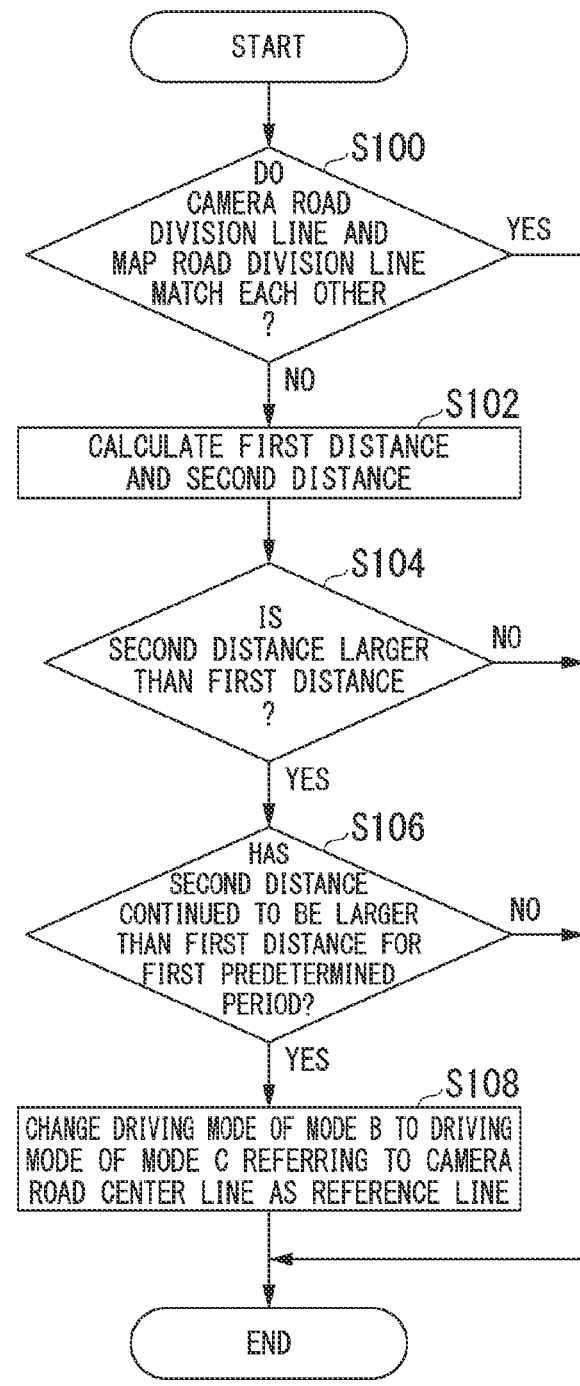
FIG. 6 is a flow chart illustrating an example of processing to be executed by the vehicle control device according to an embodiment.
Figure 7:
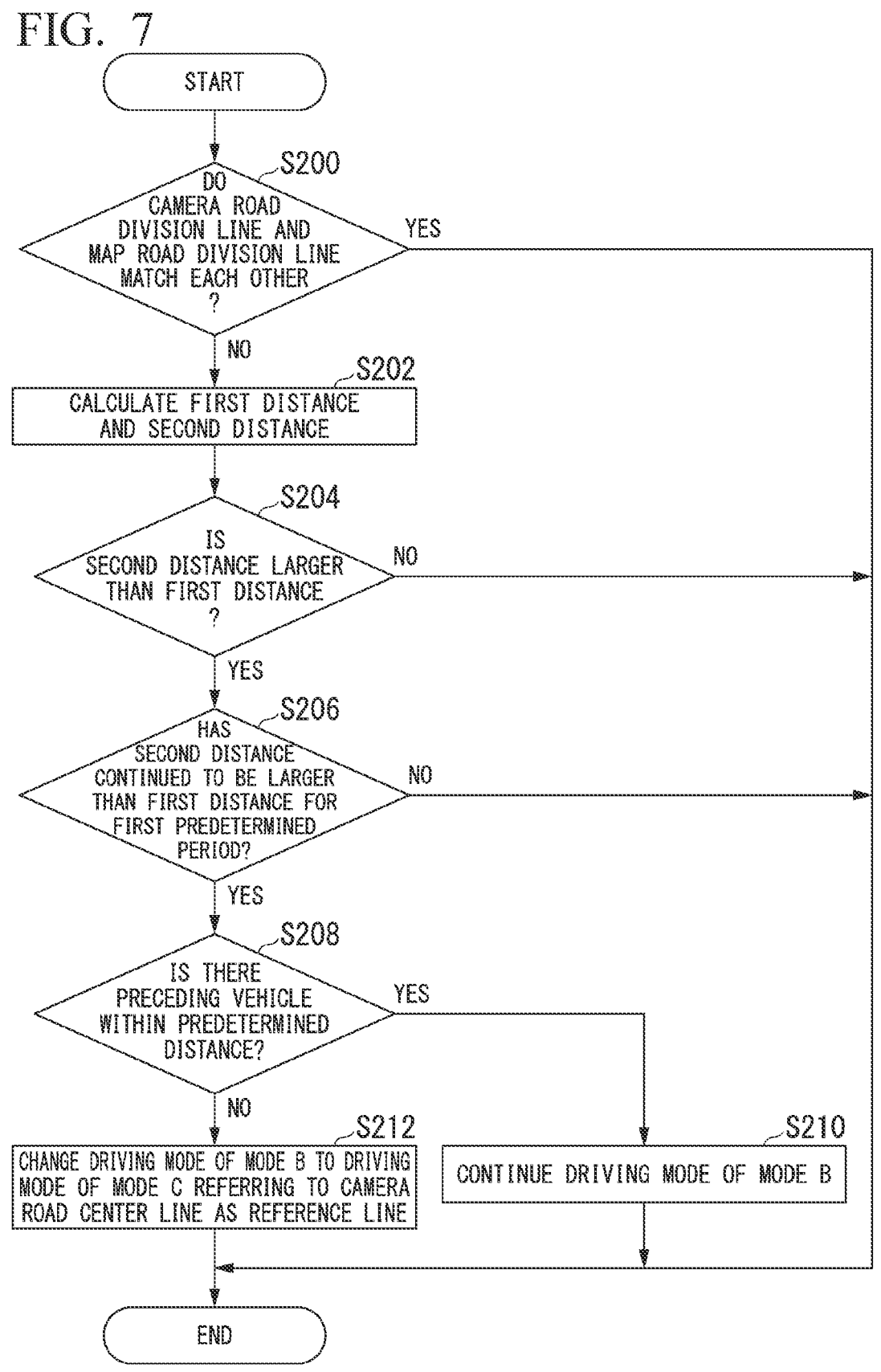
FIG. 7 is a flow chart illustrating another example of processing to be executed by the vehicle control device according to an embodiment.
Figure 8:
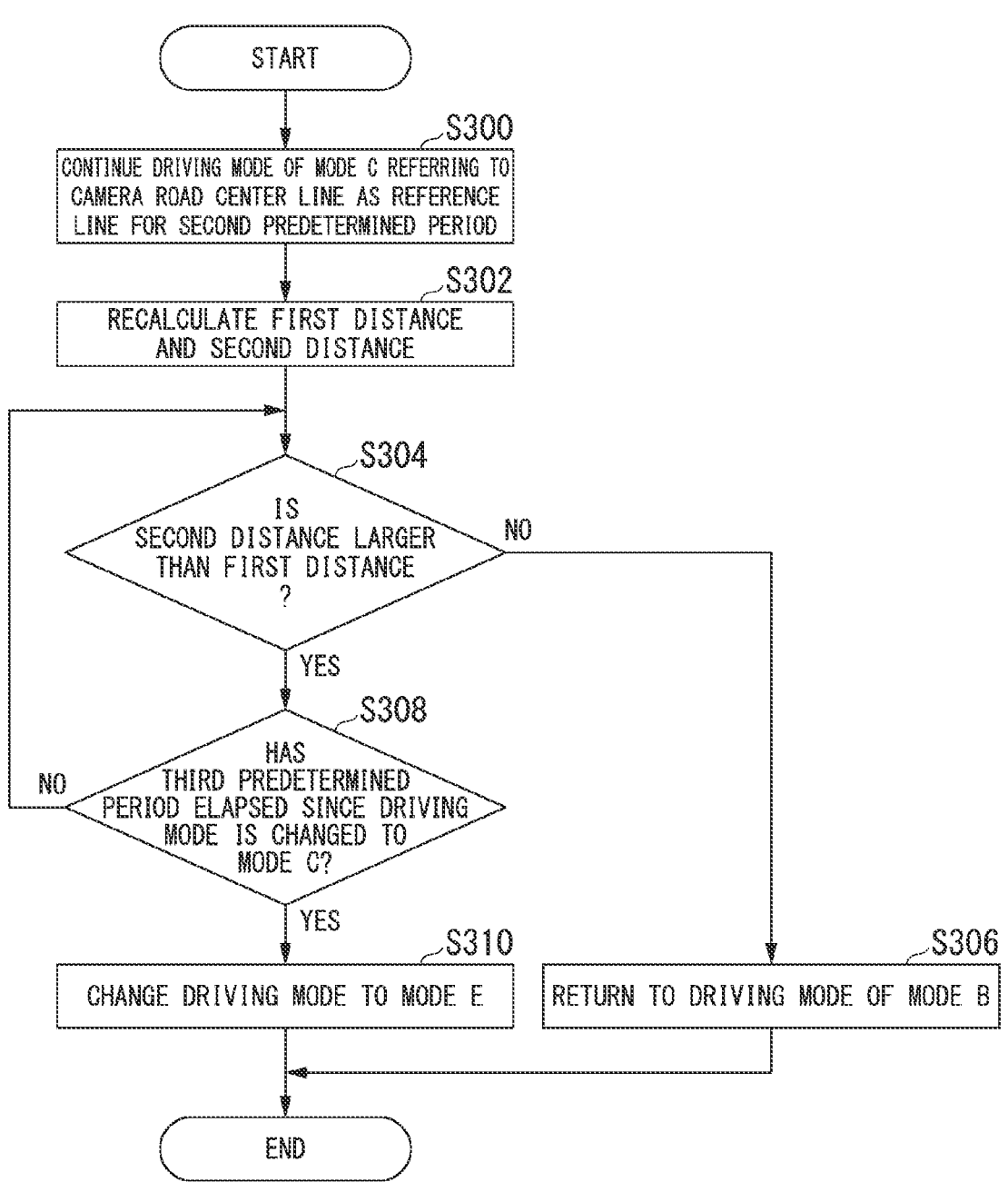
FIG. 8 is a flow chart illustrating another example of processing to be executed by the vehicle control device according to an embodiment.

Next, description is given of a flow of processing to be executed by the vehicle control device according to an embodiment with reference to FIGS. 6 to FIG. 8. FIG. 6 is a flow chart illustrating an example of processing to be executed by the vehicle control device according to an embodiment. The processing illustrated in FIG. 6 is repeatedly executed during traveling of the host vehicle M in the driving mode of the mode B referring to the map road center line MCL as a reference line.

First, the determiner 156 determines whether or not the camera road division line CL and the map road division line ML match each other (Step S100). When it is determined that the camera road division line CL and the map road division line ML match each other, the determiner 156 finishes the processing of this flow chart. On the other hand, when it is determined that the camera road division line CL and the map road division line ML do not match each other, the mode determiner 150 calculates the first distance D1 and the second distance D2 (Step S102).

Next, the mode determiner 150 determines whether or not the second distance D2 is larger than the first distance D1 (Step S104). When it is not determined that the second distance D2 is larger than the first distance D1, the mode determiner 150 finishes the processing of this flow chart. On the other hand, when it is determined that the second distance D2 is larger than the first distance D1, the mode determiner 150 next determines whether or not the second distance D2 has continued to be larger than the first distance D1 for a first predetermined period (Step S106).

When it is determined that the second distance D2 has not continued to be larger than the first distance D1 for the first predetermined period, the mode determiner 150 finishes the processing of this flow chart. On the other hand, when it is determined that the second distance D2 has continued to be larger than the first distance D1 for the first predetermined period, the mode determiner 150 changes the driving mode of the mode B referring to the map road center line MCL as a reference line to the driving mode of the mode C referring to the camera road center line CCL as a reference line (Step S108). In this manner, the processing of this flow chart is finished.

FIG. 7 is a flow chart illustrating another example of processing to be executed by the vehicle control device according to an embodiment. Similarly to FIG. 6, the processing illustrated in FIG. 7 is repeatedly executed during traveling of the host vehicle M in the driving mode of the mode B referring to the map road center line MCL as a reference line. In FIG. 7, the processing of Step 200 to Step S206 is similar to the processing of Step S100 to Step S106 in FIG. 6, and thus description thereof is omitted here.

In Step S206, when it is determined that the second distance D2 has continued to be larger than the first distance D1 for the first predetermined period, the mode determiner 150 determines whether or not there is a preceding vehicle within a predetermined distance from the host vehicle M in the travel direction (Step S208). When it is determined that there is a preceding vehicle within a predetermined distance from the host vehicle M in the travel direction, the mode determiner 150 continues the driving mode of the mode B referring to the trajectory of the preceding vehicle as a reference line (Step S210). On the other hand, when it is determined that there is no preceding vehicle within a predetermined distance from the host vehicle M in the travel direction, the mode determiner 150 changes the driving mode of the mode B referring to the map road center line MCL as a reference line to the driving mode of the mode C referring to the camera road center line CCL as a reference line (Step S212). In this manner, the processing of this flow chart is finished.

FIG. 8 is a flow chart illustrating another example of processing to be executed by the vehicle control device according to an embodiment. The processing of the flow chart illustrated in FIG. 8 is executed after the processing of Step S108 illustrated in FIG. 6 or the processing of Step S212 illustrated in FIG. 7 is executed.

First, the mode determiner 150 continues the driving mode of the mode C referring to the camera road center line CCL as a reference line for a second predetermined period (Step S300). Next, the mode determiner 150 recalculates the first distance D1 and the second distance D2 (Step S302). Next, the mode determiner 150 determines whether or not the recalculated second distance D2 is larger than the first distance D1 (Step S304). When it is determined that the recalculated second distance D2 is equal to or smaller than the first distance D1, the mode determiner 150 returns the driving mode of the mode C referring to the camera road center line CCL as reference line to the driving mode of the mode B referring to the map road center line MCL as a reference line (Step S306).

On the other hand, when it is determined that the recalculated second distance D2 is larger than the first distance D1, the mode determiner 150 determines whether or not a third predetermined period has elapsed since the mode determiner 150 changed the driving mode to the mode C (Step S308). When it is determined that the third predetermined period has elapsed since the mode determiner 150 changed the driving mode to the mode C, the processing of this flow chart returns to Step S304. On the other hand, when it is determined that the third predetermined period has elapsed since the mode determiner 150 changed the driving mode to the mode C, the mode determiner 150 changes the driving mode to the mode E, namely, manual driving (Step S310). In this manner, the processing of this flow chart is finished.

According to this embodiment described above, when it is determined that the camera road division line CCL and the map road division line MCL do not match each other during traveling of the host vehicle M in the driving mode of the mode B referring to the map information, the first distance and the second distance are compared. Then, when the second distance is larger than the first distance, the driving mode of the mode B is changed to the driving mode of the mode C referring to the camera information. As a result, it is possible to execute driving control appropriately based on the center line of the travel lane.

The embodiment described above can be expressed in the following manner.

A vehicle control device including a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a camera road division line included in the surrounding situation matches a map road division line included in the map information; and compare, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line.

This concludes the description of the embodiment for carrying out the present invention. The present invention is not limited to the embodiment in any manner, and various kinds of modifications and replacements can be made within a range that does not depart from the gist of the present invention.

17

What is claimed is:

1. A vehicle control device comprising a storage medium storing computer-readable commands, and a processor connected to the storage medium, the processor being configured to execute the computer-readable commands to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a camera road division line included in the surrounding situation matches a map road division line included in the map information; and compare, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line, wherein the first distance represents a distance, by which the vehicle can move in a lateral direction before reaching the camera road division line, in consideration of a vehicle width indicated by the vehicle information on an assumption that the vehicle is located on a camera road center line, and wherein the second distance represents, out of a left side and a right side, a larger difference between a width of the map road division line and a width of the camera road division line.

2. The vehicle control device according to claim 1, wherein the first distance is a value calculated based on a lane width of a travel lane of the vehicle, which is calculated from camera road division lines on both sides, and the vehicle width.

3. The vehicle control device according to claim 1, wherein the second distance is a value calculated based on a left distance between the map road division line on a left side and a map road center line included in the map information, a right distance between the map road division line on a right side and the map road center line, and a lane width of a travel lane of the vehicle, which is calculated from camera road division lines on both sides.

4. The vehicle control device according to claim 3, wherein the processor compares the first distance with at least one of the left distance and the right distance, and when a period in which the first distance is larger than at least one of the left distance and the right distance has elapsed for a first predetermined period, changes the second driving mode to the first driving mode that is performed referring to the camera road division line.

5. The vehicle control device according to claim 1, wherein when the processor has changed the second driving mode to the first driving mode that is performed referring to the camera road division line, the processor continues the first driving mode that is performed referring to the camera road division line at least for a second predetermined period.

6. The vehicle control device according to claim 1, wherein when the processor has continued the first driving mode that is performed referring to the camera road division line for a second predetermined period and the first distance becomes equal to or smaller than the second distance after next comparison, the processor returns the first driving mode that is performed referring to the camera road division line to the second driving mode.

7. The vehicle control device according to claim 1, wherein when the processor has continued the first driving mode that is performed referring to the camera road division line for a third predetermined period and the first distance becomes larger than the second distance after next comparison, the processor changes the first driving mode to a manual driving mode of the vehicle performed by the driver of the vehicle.

8. The vehicle control device according to claim 1, wherein when the second distance becomes larger than the first distance and there is a preceding vehicle ahead of the vehicle, the processor continues the second driving mode without changing the second driving mode to the first driving mode that is performed referring to the camera road division line.

9. A vehicle control method to be executed by a computer, the vehicle control method comprising:

recognizing a surrounding situation of a vehicle;

controlling steering and acceleration/deceleration of the vehicle based on the recognized surrounding situation and map information without depending on an operation performed by a driver of the vehicle;

determining a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

changing the driving mode of the vehicle to a driving mode imposing a heavier task when the task of the determined driving mode is not performed by the driver;

determining whether or not a camera road division line included in the surrounding situation matches a map road division line included in the map information; and comparing, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line, wherein the first distance represents a distance, by which the vehicle can move in a lateral direction before reaching the camera road division line, in consideration of a vehicle width indicated by the vehicle information on an assumption that the vehicle is located on a camera road center line, and wherein the second distance represents, out of a left side and a right side, a larger difference between a width of the map road division line and a width of the camera road division line.

10. A non-transitory computer-readable storage medium storing a program for causing a computer to:

recognize a surrounding situation of a vehicle;

control steering and acceleration/deceleration of the vehicle based on the recognized surrounding situation and map information without depending on an operation performed by a driver of the vehicle;

determine a driving mode of the vehicle as any one of a plurality of driving modes including a first driving mode and a second driving mode, wherein the second driving mode is a driving mode imposing a lighter task on the driver than the first driving mode, and a part of the plurality of driving modes including at least the second driving mode is controlled without depending on an operation performed by the driver;

change the driving mode of the vehicle to a driving mode imposing a heavier task when the task of the determined driving mode is not performed by the driver;

determine whether or not a camera road division line included in the surrounding situation matches a map road division line included in the map information; and compare, when the camera road division line and the map road division line are determined not to match each other during traveling of the vehicle in the second driving mode, a first distance calculated based on the camera road division line and vehicle information relating to the vehicle with a second distance calculated based on the map road division line, and when the second distance is larger than the first distance, change the second driving mode to the first driving mode that is performed referring to the camera road division line, wherein the first distance represents a distance, by which the vehicle can move in a lateral direction before reaching the camera road division line, in consideration of a vehicle width indicated by the vehicle information on an assumption that the vehicle is located on a camera road center line, and wherein the second distance represents, out of a left side and a right side, a larger difference between a width of the map road division line and a width of the camera road division line.

* * * * *